(12) United States Patent
Reimer

(10) Patent No.: US 6,568,273 B2
(45) Date of Patent: May 27, 2003

(54) PRESSURE SENSOR

(76) Inventor: Ernest M. Reimer, 40 Doran's Lane, Oster Cove, Newfoundland (CA), A1B 4M2

( * ) Notice: Subject to any disclaimer, the term of this patent is extended or adjusted under 35 U.S.C. 154(b) by 245 days.

(21) Appl. No.: 09/729,421

(22) Filed: Dec. 5, 2000

(65) Prior Publication Data

US 2001/0011480 A1 Aug. 9, 2001

(30) Foreign Application Priority Data

May 28, 1999 (CA) .............................................. 2273585

(51) Int. Cl.$^7$ ................................................. G01L 9/00
(52) U.S. Cl. .................. 73/705; 250/227.14; 250/231.1
(58) Field of Search ....................... 73/705; 250/227.14, 250/231.1, 231.19; 385/12, 13

(56) References Cited

U.S. PATENT DOCUMENTS 4,915,473 A * 4/1990 Haese et al. ............. 350/96.29
5,425,273 A * 6/1995 Chevalier .................... 73/705
5,480,482 A * 1/1996 Novinson .................... 106/498

FOREIGN PATENT DOCUMENTS

WO    WO 99/04234    1/1999

* cited by examiner

Primary Examiner—Benjamin R. Fuller
Assistant Examiner—Corey D. Mack
(74) Attorney, Agent, or Firm—McFadden, Fincham

(57) ABSTRACT

A sensor for detecting localized pressure bearing on the sensor, comprises a volume of compressible, light translucent material having light-scattering centers evenly dispersed throughout the material. A light emitter communicates with the material to form a virtual optical cavity within the material; the intensity of scattered light is detected by a detector. A second detector is positioned at some distance removed from the first detector, outside the virtual optical cavity. Pressure bearing on the material increases the intensity of scattered light within the optical cavity. The decreased intensity is measured by the second detector. A signal processor receives signals from the first and second detectors, and resolves these signals into information indicative of pressure bearing on the sensor.

2 Claims, 3 Drawing Sheets

PRESSURE SENSOR

FIELD OF THE INVENTION

The present inversion relates to an improved sensor for detecting localized pressure, for a wide variety of applications.

BACKGROUND OF THE INVENTION

Sensors for the detection of localized pressure (i.e. pressure imposed on a particular object as distinct from atmospheric pressure) may employ the principle whereby the intensity of light or other wave energy from a source, which is diffused and scattered within a scattering medium such as translucent foam, is increased in the vicinity of the light source as the concentration of scattering centers within the medium increases, i.e., the average distance between scattering centers decreases. A similar effect is achieved if the nature of the scattering centers changes to change their light reflective or refractive properties.

The region within the medium which contains scattered light from the source is known as a "virtual optical cavity" since this region effectively emulates an optical cavity. For simplicity, this region will be referred to as simply an "optical cavity". The intensity of diffused or sattered light at any particular position within an optical cavity is referred to as the "integrated intensity" of the light at that position. Thus, as the medium is compressed by the application of pressure, the integrated intensity of the light within the region immediately surrounding the light source increases in intensity. The increase is proportional to the increase in concentration of scattering centers or a change In the nature of the scattering centers. This in turn may be related to increases in localized pressure applied to the medium. The consequent decrease in light intensity occurs within a more distant region within the medium. For example, U.S. patent application Ser. No. 08/895,268 (Reimer et al.) describes a pressure sensor based on this principle, in which the scattering medium may comprise either a material having scattering centers dispersed generally evenly therein, or a hollow deformable container, the inner surface of which diffuses light or other wavelike energy directed into the medium. The light source forms an integrated cavity within the medium, defined by a region containing fully scattered light from the source. When pressure is applied to the medium, the medium compresses and increases the concentration of scattering centers in the region surrounding the light source. The resulting increase in light intensity is detected by a receptor and communicated to an information processor. In one version, a multiplicity of light sources and receivers permits the general location of the pressure to be resolved. Within an apparatus of this type, one or more light sources and detectors are provided, with each source and a corresponding detector being generally adjacent to each other or dose together. Most conveniently, the scattering medium comprises a compressible, translucent material such as plastic foam. An array of source/detectors pairs may be provided to provide localized pressure detection means. The detector or detectors are associated with a signal processing unit, which receives information from the detectors corresponding to the detected integrated light intensity levels, and resolves this information into a corresponding pressure level experienced by the scattering medium.

References herein to the word "light" includes within its scope light in visible and non-visible wavelengths.

The pressure sensors of the type characterized within the above-referenced prior art, may be subject to "noise" as a result of several factors. Most importantly, interference may result in a change in the light absorption characteristics of the scattering medium, or the scattering centers themselves. A change in absorption would affect light intensity within the regions surrounding the light source, and this could be mistaken for a deformation effect Such a change might take place in a polymeric medium as the result of long term aging photo-oxidation. It would therefore be valuable to provide more robustness to this type of sensor by enabling it to better differentiate noise from signal. It is accordingly desirable to integrate within a sensor of this sort, a means to measure the light absorption properties of the scattering medium. Absorption measurement for optical energy or other forms of directly transmitted or reflected wave energy is a well known art, and the principles for the measurement for absorption in transmission or reflection by means of various photometers have been thoroughly documented in scientific literature. However, it has not been previously proposed to introduce an absorption measuring element into a pressure sensor of the above type.

SUMMARY OF THE INVENTION

An object of the invention is to provide a pressure sensor for detecting point source or localized pressure, which operates by detection of the intensity of scattered light within a compressible carrier medium, and which has an improved signal to noise ratio.

In one aspect, the invention comprises a pressure sensor having improved signal to noise sensitivity, of the type comprising a volume of a generally translucent material having light scattering centers evenly dispersed therein, and which is readily deformable under pressure;

a source of light or other wave energy associated with the material and positioned to direct light into the material to form a virtual optical cavity within the material within which light from the source is fully scattered;

a first light detector, in operative association with the translucent material positioned generally adjacent to or in the immediate vicinity of the light source, for detecting light intensity within the optical cavity; characterized by:

a second light detector in operative association with the translucent material, for detecting the intensity of light within the material at a position outside the optical cavity; and signal processing means operatively associated with the two detectors, for receiving light intensity information from the detectors, and resolving the information thus received into a measure of localized pressure bearing on the material.

In the above aspect, the invention takes advantage of the phenomenon whereby deformation or compression of a material having light scattering centers dispersed therein causes an increase in the integrated intensity of light emanating from a point source within an optical cavity formed by the light within the material. The increase is proportional to a decrease in light intensity within the material at positions immediately outside, the optical cavity. By measuring scattered, or integrated, light intensity both within the optical cavity and immediately outside the cavity, an enhanced sensitivity and improved ability to discriminate changes in light scattering from changes in absorption, may be achieved over measurement only of light intensity within the cavity. The results apply both with respect to measurement and for purposes of noise signal discrimination.

Having thus generally characterized the invention, a detailed description of preferred embodiments of the invention will follow, by way of reference to the attached drawings wherein:

DETAILED DESCRIPTION OF THE PREFERRED EMBODIMENTS

Figure 1:
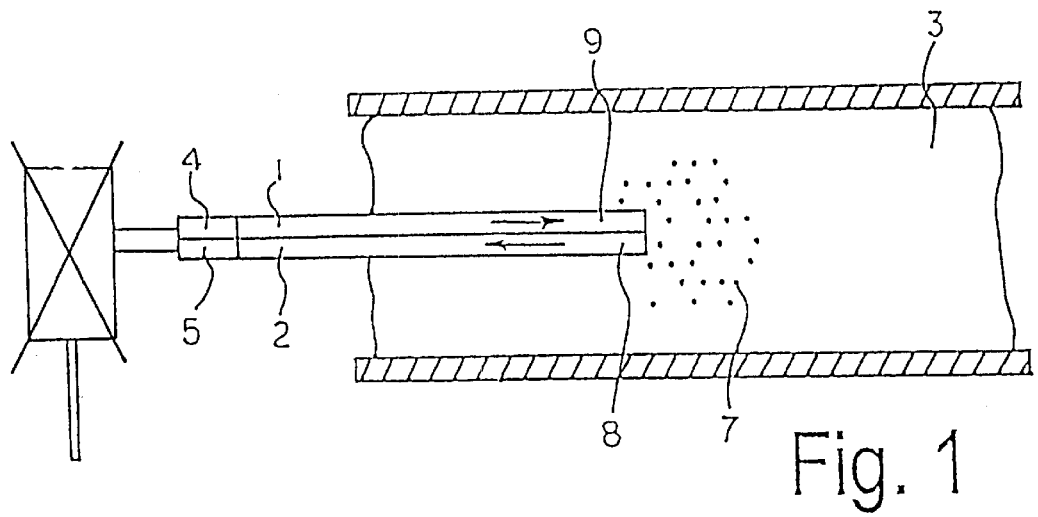
FIG. 1 is a schematic view of a prior art pressure sensor.
Figure 2:
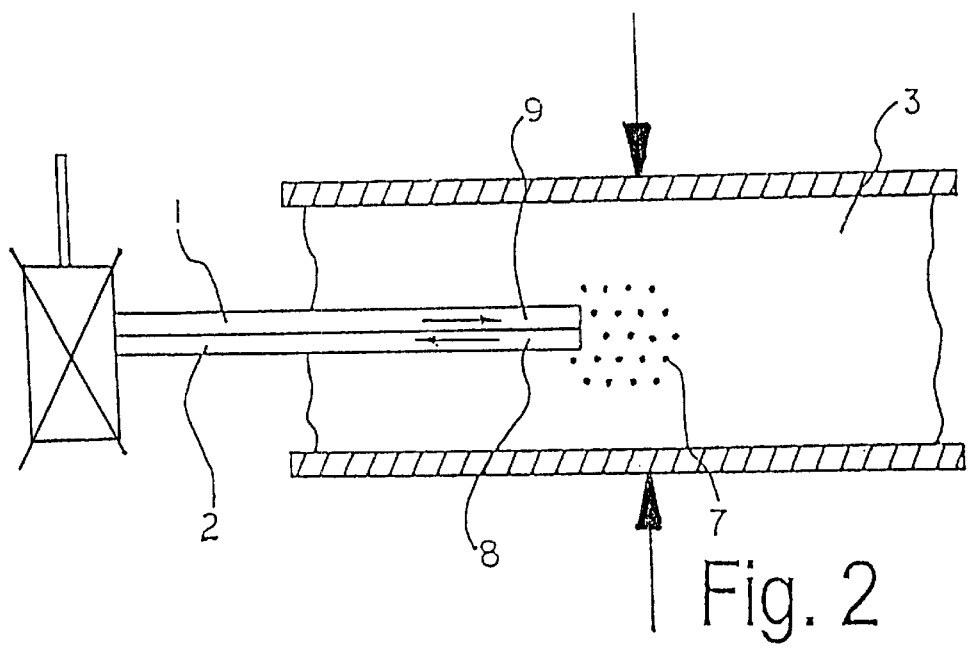
FIG. 2 is a further schematic view of a prior art pressure sensor, in a compressed position.

FIGS. 1 and 2 illustrate a prior art optical scattering geometry sensor consisting of an optical fiber transmitter 1 and receiver 2 imbedded in a scattering medium 3.

The scattering properties of the medium 3 vary in response to deformation creating an optical signal proportional to the applied pressure. As shown in FIG. 1 a prior art sensor can be created by terminating an optical fiber pair 1, 2 in compressible open cell, translucent foam 3. This open cell foam when made of polyurethane is typically white in appearance. This foam 3 has a translucent, self-supporting matrix with millimeter level pore sizes. One optic fiber 1 provides light from a source, such as a light emitting diode 4. The other receives light which is transferred to a photodiode 5.

In FIG. 2 the effect of compression of the scattering medium 3 is shown by the contraction of the volume of the illuminated zone 7 or region within the light scattering foam 3 as pressure is applied. This illumination zone 7 functions as an integrating optical cavity. Not only does this zone 7 contract in volume, but the brightness within its interior increases. By placing the sensing end 8 of the light sensing fiber 2 at a location that remains within the shrinking illuminated volume 7, upon compression, e.g. adjacent to the light source end 9, the sensor 2 will provide an output signal that rises as compaction of the foam 3 increases.

While the illustrated prior art version shows a single emitter/detector pair, it is feasible to provide multiple, spaced apart emitter/detector pairs to provide a measure of localized pressure bearing on the detector.

The effectively illuminated region 7 within the scattering medium is referred to herein as a "virtual optical cavity" or for convenience simply an "optical cavity". The optical cavity is characterized by a region within which light emitted by the emitter 9 is fully scattered arid diffused. Within the optical cavity, the scattered and diffused light increases in intensity as the medium is compressed and the scattering centers are correspondingly concentrated. Light received by the detector is substantially fully scattered and is not received directly from the emitter. The size of the zone of effective illuminator comprises the optical cavity, which is defined as radius of one characteristic scattering length of light within the medium. This in turn will depend on the scattering centre density or the nature of scattering centers within the medium. The cavity will decrease in volume as the medium is compressed and the scattering center density correspondingly increases.

It will be further sen that compression of the scattering medium, which results in a contraction of the size of the optical cavity and a corresponding increase in light intensity therein, also results in a corresponding decrease in light intensity within a region outside the optical cavity.

Figure 3:
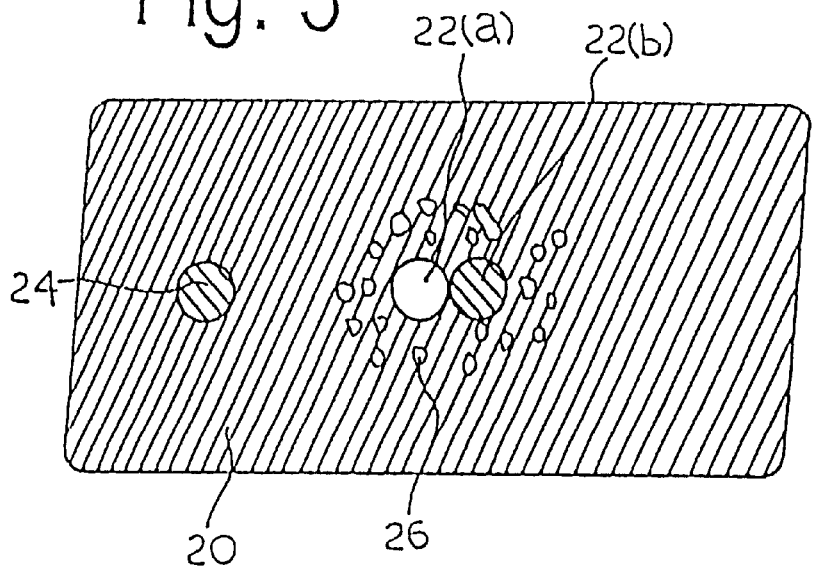
FIG. 3 is a schematic view of a portion of a first embodiment of a pressure sensor according to the present invention.

A first embodiment of the present invention is illustrated schematically in FIG. 3. In this version, the phenomenon whereby light intensity increases within the optical cavity upon an increase in concentration of the scattering centers, and correspondingly decreases outside the cavity, is harnessed to provide a pressure sensor having enhanced sensitivity. In this version, a deformable and compressible scattering medium 20 is provided, of the general type as comprised above, A relatively closely spaced apart emitter/detector pair 22(a) and (b) communicates with the scattering medium, for example, by means of paired fiber optic cables implanted within the medium. A second detector 24 is provided within the medium 20, at some distance removed from the emitter/detector pair. The spacing between the second detector and the light emitter will depend in part on the sensitivity of the detector, the Intensity of the light emitted by the emitter, and the scattering properties of the medium, e.g., the concentration of light scattering centers. The second detector 24 is positioned outside the optical cavity 26 formed by the light emanating from the emitter 22(a).

Upon compression of the scattering medium, the integrated light intensity within the optical cavity 26 increases. A corresponding decrease occurs in the region immediately outside the optical cavity, within which the second detector 24 is positioned.

Figure 4:
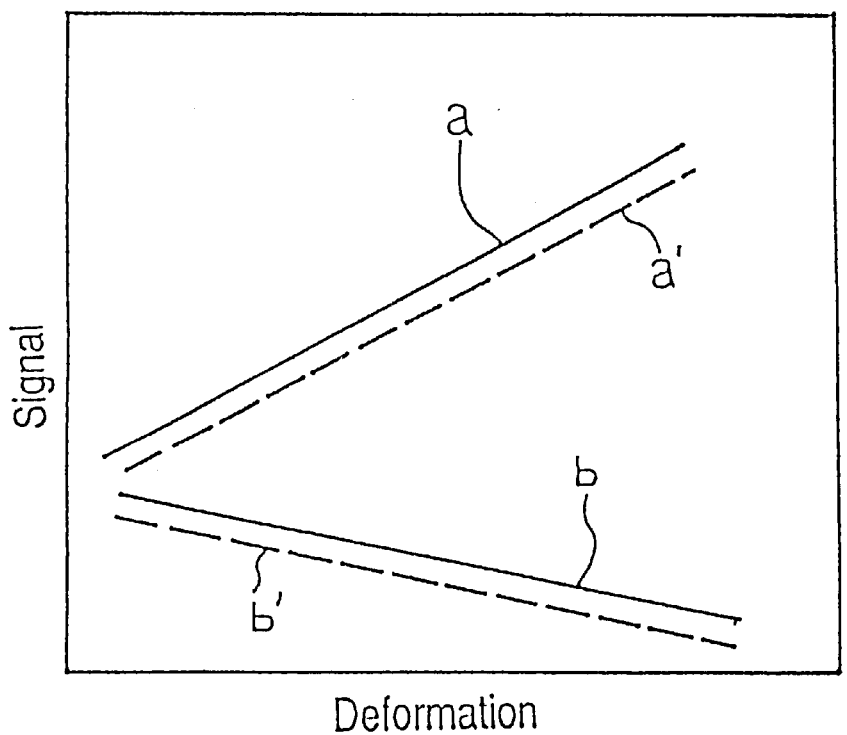
FIG. 4 is a graph illustrating the signals transmitted by a first embodiment pressure sensor, in response to deformation of the sensor.

FIG. 4 illustrates us first signal (line "a") received by the first detector in response to increasing compression of the sensor 22(b), and a second signal (line "b") received by the second detector 24, in response to the compression. It will be seen that with increasing pressure, the first detector detects an increasing integrated light intensity, while the second detector detects a decrease of light intensity. Secondary lines a' and b' represent a proportionate decrease in signal strength lost to light absorption within the scattering medium. The processing unit receives the light intensity information from both detectors 22(b) and 24, and resolves same into a measure of the pressure bearing on the sensor, said combined measure being insensitive to 'noise' in the sensor due to absorption.

The dual detectors of the first embodiment permit enhanced sensitivity of the detector, and a reduction in the interference that would otherwise be experienced. Typically, interference results from a change in the light absorption characteristics of the transmission medium or of the scattering centers. For example, this might occur because of degradation over time of a polymeric scattering medium. A change in absorption characteristics would affect light intensity within the optical cavity and, with a single detector, could be mistaken for a deformation effect. The enhanced resolution provided within this version enhances the ability of the detector to differentiate this form of "noise" from "signal". Absorption affects both detector signals in the same way while compression affects the two detector signals in opposite ways, thereby providing a basis for signal discrimination between the two physical phenomena.

Figure 5:
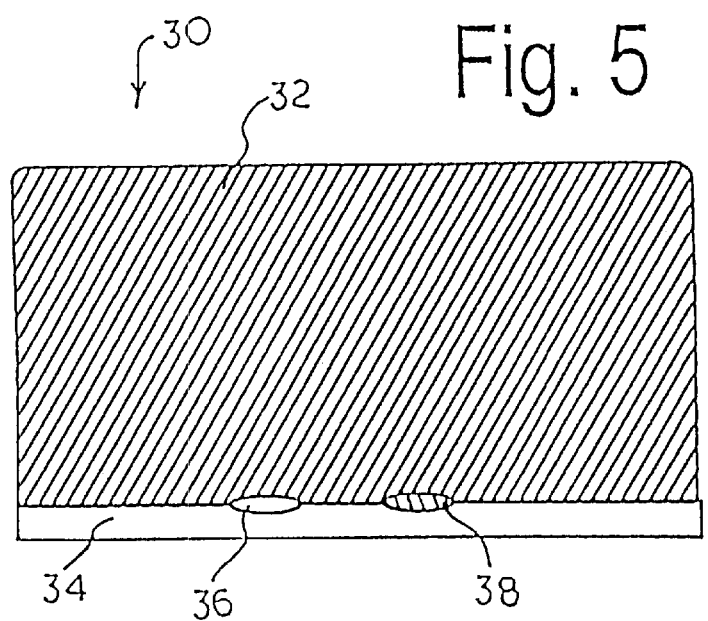
FIG. 5 is a second embodiment of a pressure sensor.
Figure 6:
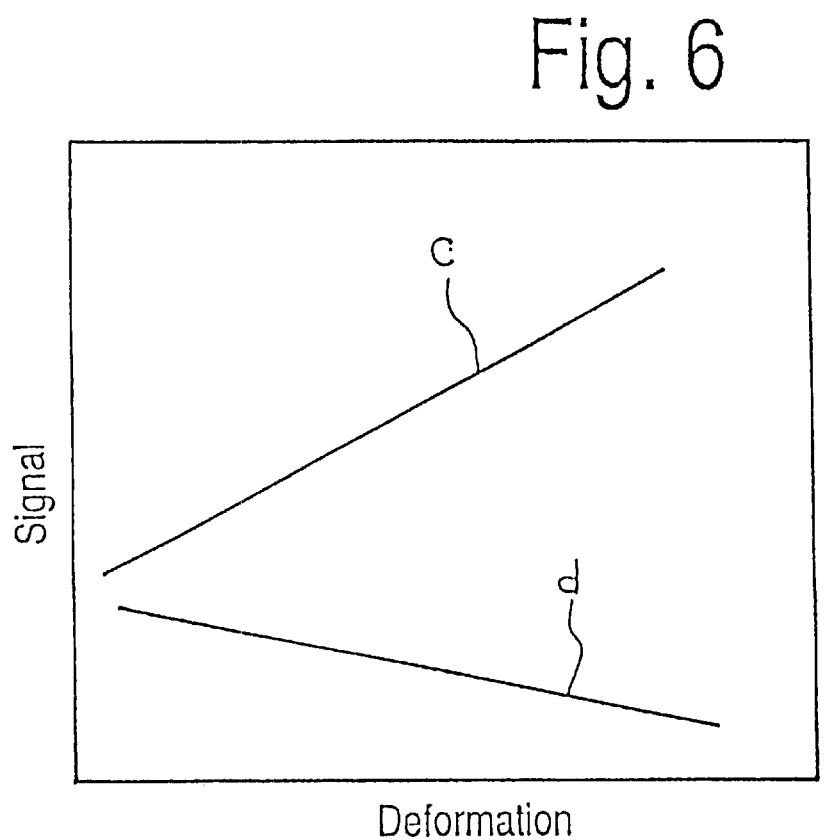
FIG. 6 is a graph illustrating the signals transmitted by the second embodiment pressure sensor in response to deformation.

A further embodiment of the invention provides an example of the variance in signal (i.e., increasing vs. decreasing scattered light level) received by the detector depending on the spacing of the detector from the emitter, as illustrated within FIGS. 5 and 6. FIGS. 5 and 6 illustrate a pressure sensor 30 of the type characterized above, comprising a compressible medium 32 such as an open cell urethane foam, laminated to a silicon substrate 34. A light emitting source such as a diode 36 mounted on the substrate directs light into the compressible medium, thereby forming an optical cavity within the region around the light source. A photoreceptor 38 on the substrate is positioned at some distance removed from the light source. In one version, the spacing is within approximately 2 mm, and in a second version, the spacing between the source 36 and detector 38 is greater than approximately 2 mm. In other versions, the actual spacing will depend on the nature of the compressible medium and the light intensity emitted by the source. The emitter and detector mounted on the silicon type circuit board 34 both "look" in the same direction, with an overlapping field of illumination and field of view. Within the first positioning mode, the sensor is positioned within a "characteristic scattering length" of the emitter, this being a distance within which light intensity increases in response to compression of the medium. In the second mode described above, the sensor is mounted at a distance greater than the characteristic scattering length. The resulting signal received by the respective receiver positions is illustrated within FIG. 6. Integrated light intensity detected by the detector 38 positioned within the field of illumination increases in response to the compression of the medium (line "c"), while in the second more removed position, signal strength decreases in response to compression (line "d"). The signal discrimination characteristics are the same as those described with reference to FIG. 4.

I claim:

1. A sensor for detecting localized pressure bearing on said sensor, comprising:

a volume of light-translucent material having light-scattering centres generally evenly dispersed therein;

a light emitter in operative communication with said material for emitting light into the interior of said material and thereby forming a virtual integrated optical cavity within the interior of said material, said optical cavity defined by a region within which light from said light emitter is generally fully scattered;

a first light detector in operative communication with said material for detecting the integrated intensity of scattered light within said optical cavity;

signal processing means in operative communication with said first light detector, for converting said integrated light intensity level detected by said first light detector to a corresponding signal; characterized by:

a second light detector in operative communication with said material for detecting the intensity of light within said material, at a position outside of and adjacent to said optical cavity, for detecting a decrease in integrated light intensity which is proportional to an increase in light intensity within said optical cavity generated by pressure bearing on said volume of material; and said signal processing means being in operative communication with said second light detector for converting the light intensity detected by said first and second light detectors into a signal corresponding to the local pressure bearing on said sensor.

2. A method for detecting localized pressure bearing on a pressure sensor, comprising:

providing a volume of light-translucent material having light-scattering centres generally evenly dispersed therein, a light emitter in operative communication with said material for emitting light into the interior of said material and thereby forming a virtual integrated optical cavity within the interior of said material, said optical cavity defined by a region within which light from said light emitter is generally fully scattered, a first light detector in operative communication with said material for detecting the integrated intensity of scattered light within said optical cavity, and signal processing means in operative communication with said first light detector;

imposing localized pressure on at least a portion of said volume of material, thereby increasing the integrated intensity of light within said optical cavity;

processing signals received from said first light detector within said signal processing means, into a useable signal indicative of said pressure; characterized by:

providing a second light detector in operative communication with said volume of material and said signal processing means, said second light detector being positioned to detect the integrated intensity of light in a region of said material outside of said optical cavity and adjacent thereto;

detecting a decrease in integrated light intensity which is proportional to the increase in integrated intensity within said optical cavity; and resolving signals from said first and second light detectors within said signal processing means to provide a measure of the local pressure bearing on said sensor.

* * * * *